Figure 1A:
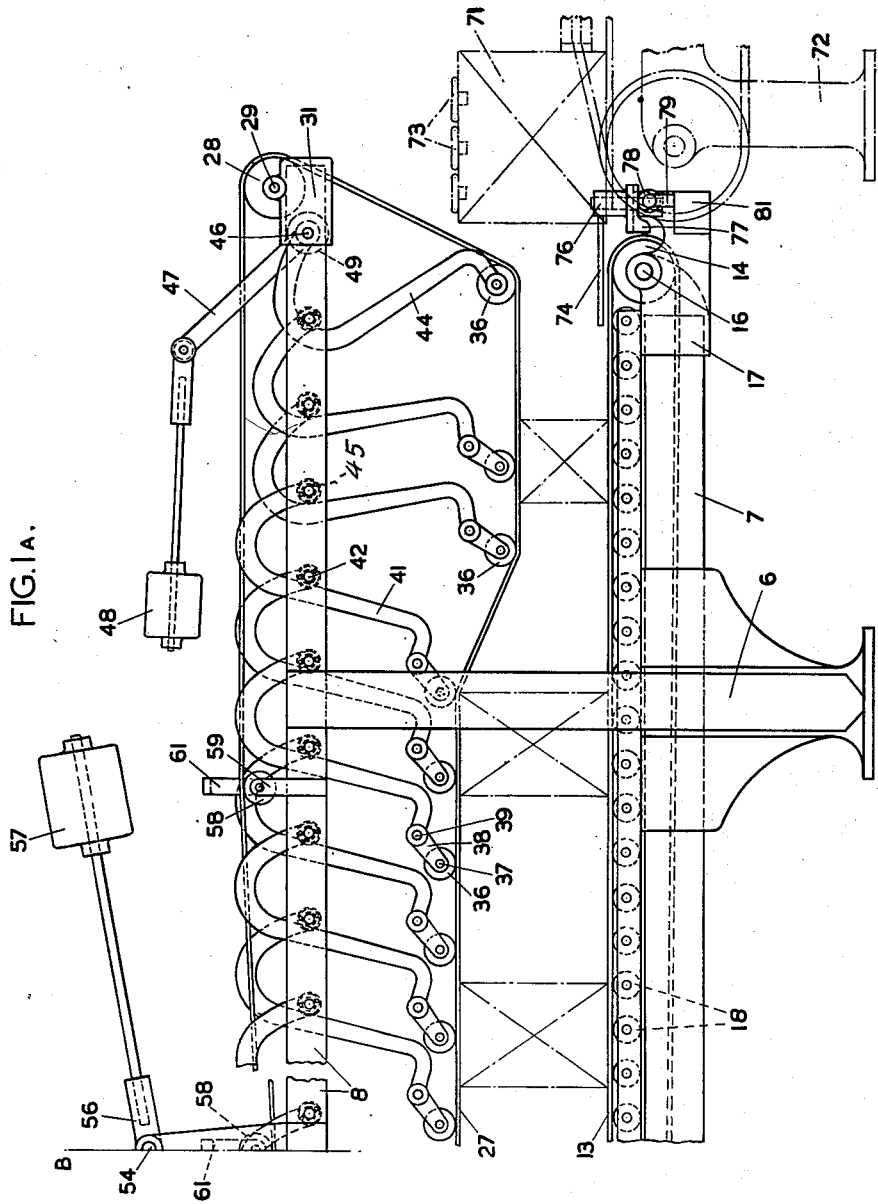

Sept. 2, 1941.  A. G. ROSE  2,254,860
CONVEYER
Filed May 14, 1940  4 Sheets-Sheet 1
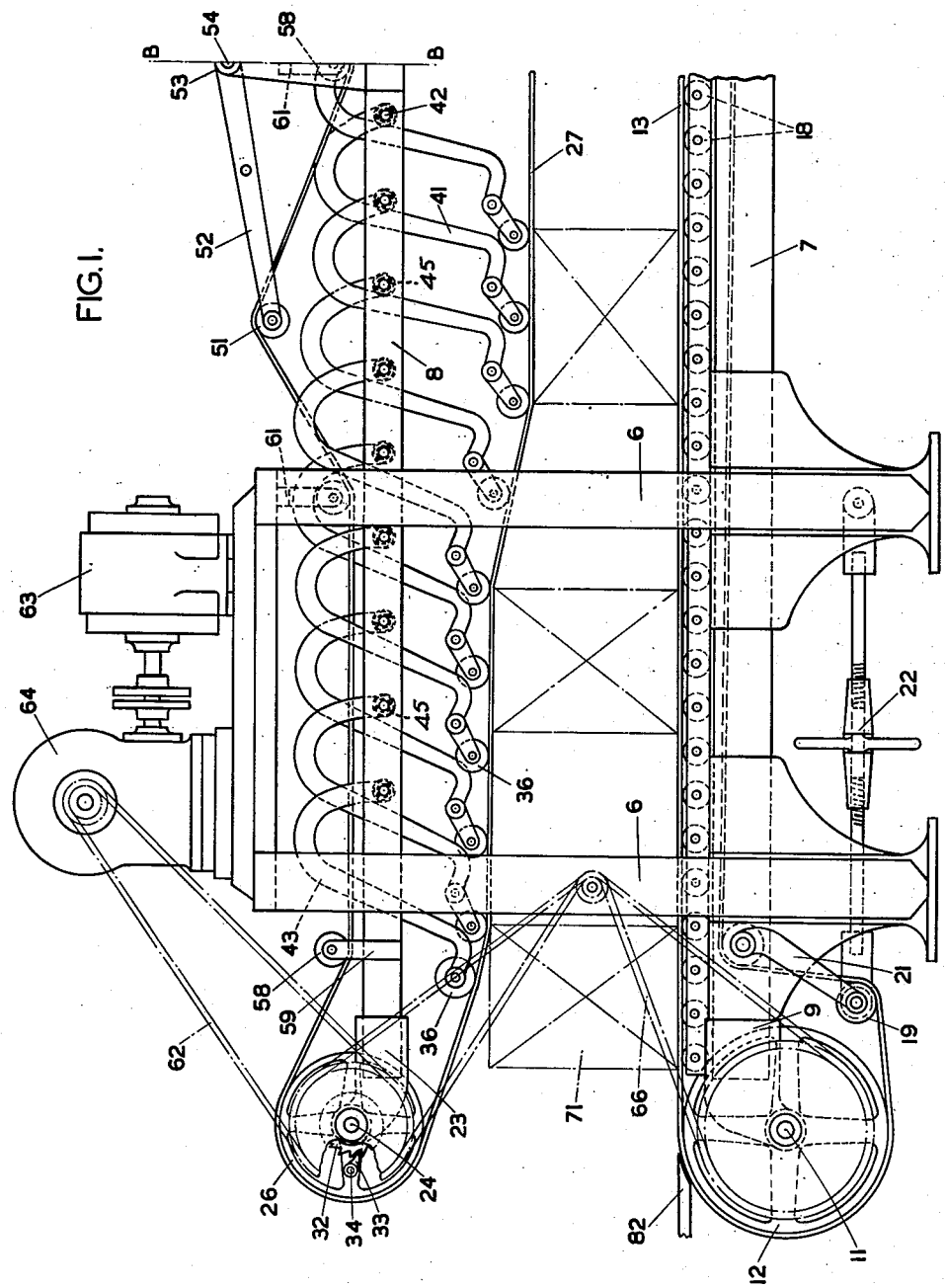
INVENTOR:
A.G.ROSE.
BY
*Munn, Anderson & Libby*
ATTORNEYS.

Sept. 2, 1941. A. G. ROSE 2,254,860
CONVEYER
Filed May 14, 1940 4 Sheets-Sheet 2

INVENTOR:
A.G.ROSE.
BY
Munn, Anderson & Liddy
ATTORNEYS.

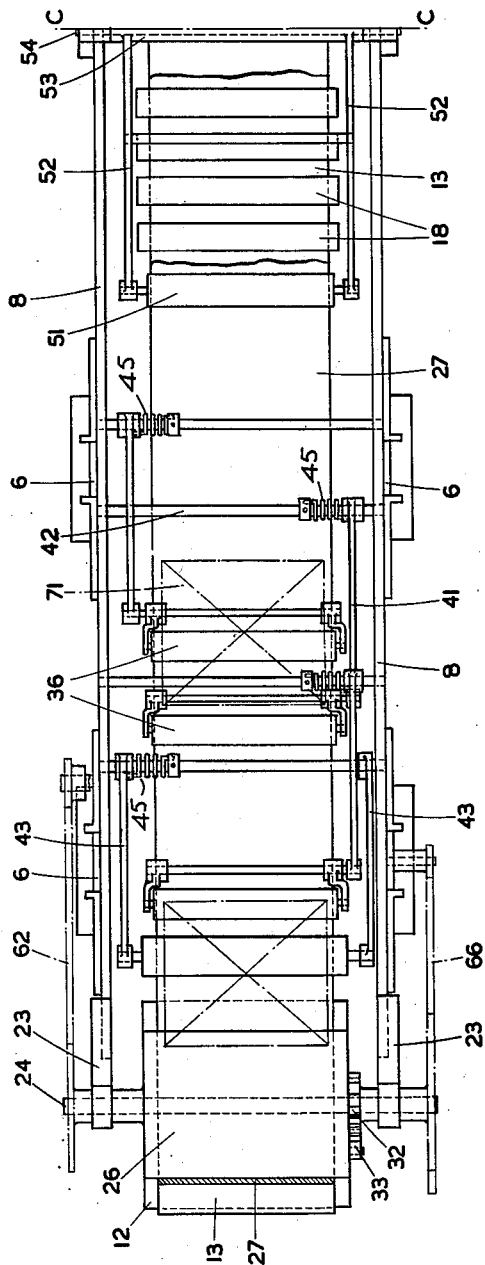

Sept. 2, 1941.  A. G. ROSE  2,254,860
CONVEYER
Filed May 14, 1940   4 Sheets-Sheet 4

INVENTOR:
A.G.ROSE.
BY
Munn, Anderson & Liddy
ATTORNEYS.

Patented Sept. 2, 1941

2,254,860

UNITED STATES PATENT OFFICE 2,254,860

CONVEYER

Alfred German Rose, Gainsborough, England, assignor to Rose Brothers (Gainsborough) Limited, Gainsborough, England, a British company Application May 14, 1940, Serial No. 335,052
In Great Britain April 18, 1939

9 Claims. (Cl. 198—165)

This invention relates to conveyers of the type used for conveying cardboard boxes or like containers (hereinafter referred to as "containers") from a container closing and sealing device to a delivery station during which conveyance the conveyer exerts pressure upon the newly sealed flaps of the container so as to maintain the closure during the drying of the sealing medium. This type of apparatus comprises a lower conveyer platform, for example, an endless belt, and an upper conveyer member consisting of an endless belt provided with a series of pressure rollers arranged to bear against the inner face of the lower lap of the belt to exert pressure upon containers fed between the lower conveyer platform and the upper conveyer member.

When dealing with containers of different heights on this type of apparatus, however, it is necessary to provide for a relative adjustment between the lower conveyer platform and the upper conveyer member.

It is an object of the present invention to provide an improved apparatus of this type which will automatically accommodate itself to containers of different heights.

According to one feature of the present invention, there is provided in or for a conveyer of the type described, an upper conveyer member comprising an endless belt supported at one end on a belt driving roller and at the other on a supporting roller, and a plurality of pressure rollers arranged to bear against the inner face of the lower lap of the belt and each supported at one end only on an arm pivotally mounted about an axis parallel to the axis of the belt driving roller, said arms being so arranged that alternate rollers are supported at opposite ends. Preferably the belt is provided with one or more tension rollers arranged to bear against the upper lap of the belt and adapted automatically to take up slack in the belt.

The degree of pressure required to be exerted on the belt by the pressure rollers may be obtained merely by the weight of the rollers and their supporting arms. Spring means may, however, be provided on the arms to cause any additional downward pressure required on the rollers.

With alternate pressure rollers supported at opposite ends in accordance with this invention, the pitch of the supporting arms and hence the pressure rollers may be small in comparison with the length of the conveyer, say six inches pitch, while still allowing the arms to swing clear of each other when moving from one level to another as containers of different heights are fed to the conveyer. It will be understood that the smaller the pitch of the pressure rollers the more even will be the pressure exerted by the belt on the containers.

When a container of small height is followed into the conveyer by one of large height, the pressure rollers by swinging forward so as to assume a higher level to accommodate the container of greater height cause a certain amount of slack in the lower lap of the belt which has to be taken up by the belt tension roller. Since this tension roller operates on the upper lap of the belt, however, it has to draw the slack part of the lower lap around the belt driving roller at a momentarily increased speed and consequently against the frictional drag of the driving roller.

To facilitate the taking up of such slack in the belt, according to a further feature of the present invention, there is provided in the belt driving roller, a free-wheel mechanism (e. g. a ratchet mechanism) adapted to allow the belt driving roller to over-run under the pull of the belt by the belt tension roller.

Figure 2A:
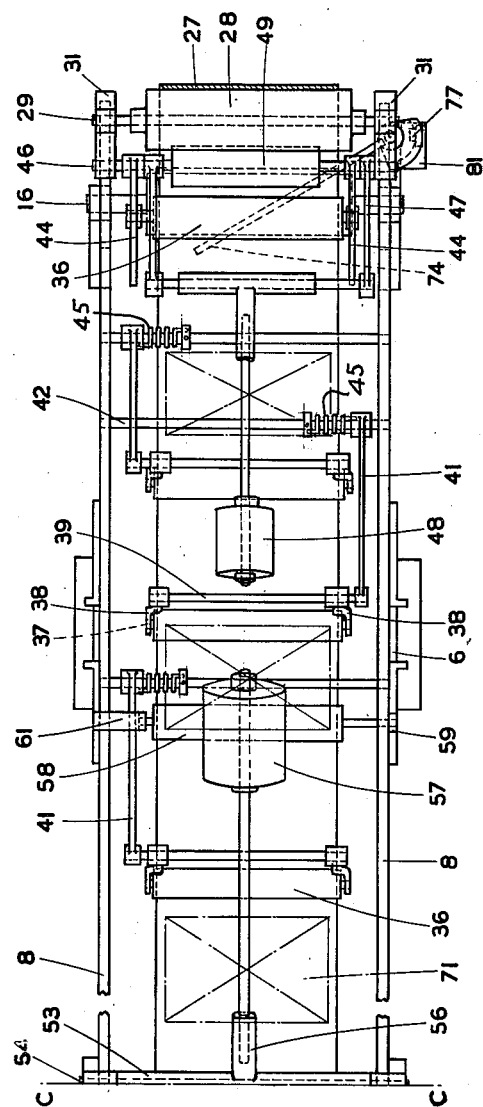

The invention will now be described, by way of example, in greater detail, with reference to the accompanying diagrammatic drawings, in which:

Figures 1 and 1A, when joined on the line B—B, are an elevation of a conveyer constructed in accordance with this invention; and Figures 2 and 2A, similarly joined on the line C—C, are a plan view of the apparatus shown in Figures 1 and 1A with certain parts removed for clarity of illustration.

The conveyer is supported on a framework consisting of stands 6, lower side rails 7, and upper side rails 8. Mounted in a pair of brackets 9 attached to the lower side rails 7 is a shaft 11 on which is supported a lower belt driving roller 12 which drives a lower conveyer belt 13. The belt 13 is supported at the opposite end of the conveyer on a roller 14 freely mounted on a shaft 16 carried in brackets 17 attached to the lower side rails 7.

Supporting the upper lap of the belt 13 is a series of freely mounted rollers 18. The belt 13 is kept taut by means of a roller 19 mounted in a pair of arms 21 pivotally attached to the lower side rails 7 and provided with a screw adjusting device 22.

Mounted in brackets 23 attached to the upper side rails 8 is a shaft 24 carrying an upper belt driving roller 26 which drives an upper belt 27 which is supported at the opposite end of the conveyer on a roller 28 freely mounted on a shaft 29 carried in brackets 31 attached to the upper side rails 8.

The upper belt driving roller 26 is freely mounted on the shaft 24 and is driven by means of a ratchet wheel 32 secured to the shaft 24 and engaging with a ratchet pawl 33 pivoted at 34 on the belt driving roller 26, the pawl 33 being spring urged into engagement with the ratchet wheel in a manner well known.

Arranged to bear against the inner face of the lower lap of the belt 27 in a plurality of pressure rollers 36 each freely mounted on a spindle 37 carried in brackets 38 secured to a rod 39 protruding from an arm 41 pivoted on a shaft 42 extending between the upper side rails 8. Torsion springs 45 are provided for urging the pressure rollers 36 into contact with the belt 27.

As will be clear from Figures 2 and 2A, in which only a few of the arms 41 are shown, alternate arms 41 support opposite ends of alternate pressure rollers 36.

The pressure roller 36 nearest to the driving roller 26 is provided with a pair of arms 43 which are spaced apart sufficiently to allow the brackets 38 and arm 41 of the adjacent pressure roller 36 to swing clear of the arms 43. The pressure roller 36 nearest to the belt supporting roller 28 is also provided with a pair of arms 44 to give additional support for the belt 27 against the push of the containers. The arms 44, like the arms 43, are disposed so as to clear the adjacent arm 41. The arms 44 are attached to a shaft 46 to which is secured a forked lever 47 carrying an adjustable weight 48. Freely mounted on the shaft 46 is a roller 49 against which the belt 27 bears when pushed inwardly by a container.

The length of the upper belt 27 is such as to allow all the pressure rollers 36 to drop to their lowest position which is determined in this case by contact between the curved upper portion of the arms 41 and the shafts 42 which thus act as stops. This being the case, it will be understood that, when dealing with containers of greater height than the minimum height for which the conveyor is designed, a certain amount of slack is produced in the lower lap of the belt as it is pushed upwardly and forwardly by the container, the amount varying with the height of the container. This slack in the belt is taken up in a loop in the upper lap of the belt 27 by a tension roller 51 freely mounted between arms 52 of a forked lever 53 pivoted at 54 and having a further arm 56 carrying an adjustable weight 57. Belt guide rollers 58 freely mounted in pairs of brackets 59 are also provided. Bridges 61 are provided where necessary on the brackets 59 for the passage of the arms 41.

The upper belt driving roller 26 is driven by means of chain and sprocket gearing 62 from a motor 63 and reduction gear 64 while the lower belt driving roller 12 is driven from the shaft 24 by chain and sprocket gearing 66.

In operation, containers 71 are fed to the conveyer, for example, by the closing and sealing device indicated by dot-dash lines at 72 in Figure 1A, the flaps of the containers 71 being maintained closed by flanged rollers 73 on the closing and sealing device until the containers 71 are nipped between the upper belt 27 and the lower belt 13 of the conveyer.

The containers 71 are delivered intermittently from the closing and sealing device, and for this reason, a container-operated switch is provided to start the conveyer each time a container is fed and to stop the conveyer as soon as the container is nipped between the upper belt 27 and the lower belt 13. The container-operated switch operates as follows:

As each container 71 approaches the conveyer, it strikes a bar 74 of a switch member 76 which causes a cam 77 to rock and depress a cam roller 78 mounted on a plunger 79 to operate a switch 81 which starts the motor 63.

The conveyer is thus started and continues to move until the rear face of the container 71 passes the tip of the bar 74 and allows it to spring back to release the switch 81 and stop the motor 63. The conveyer then remains stationary until the next succeeding container 71 is fed and again operates the switch.

If the container 71 about to be fed is of greater height than the preceding container, as shown in Figure 1A, the upper belt 27 is pushed forward and upward by the top of the container and caused to assume the level of the top of the container, each pressure roller 36 automatically adjusting itself to the new level as it is approached by the container and tending to return to its original position after passage of the container, the weight 48 resisting the tendency of the roller 51 under the influence of the weight 57 to retain the pressure rollers 36 in their elevated position.

As a container of large height passes through the conveyer, it causes a certain amount of slack to be formed in the lower lap of the belt 27 between itself and the driving roller 26. This slack is taken up by the roller 51 rising under the influence of the weight 57 to cause the driving roller 26 momentarily to travel at an increased speed, during which time the ratchet pawl 33 slips over the teeth of the ratchet wheel 32.

Whilst the roller 51 takes up the slack formed in the lower lap of the belt 27 by the raising of the pressure rollers during the passage of containers of large height as described above, its effect on the lower lap of the belt 27, when there are no containers passing through, or when a container of large height is followed by one of small height, is balanced by the action of the weight 48 acting on the first pressure roller 36 (the one on the extreme right in Figure 1A), together with the combined downward thrust of the pressure rollers 36, their supporting arms and the lower lap of the belt.

The pressure rollers 36 and the tension roller 51, therefore, are in a state of equilibrium with the pressure rollers in their lowest position and it will be seen that, whilst the state of equilibrium is disturbed by the passage of containers of different heights, the pressure rollers are at all times tending to return to their original positions. It will be understood, of course, that when it is desired to pass containers of maximum and minimum height through the conveyer at the same time, it is necessary, in order to obtain the best results, to provide for a greater space between the containers than is necessary when containers differing in height by only a small amount are to be passed through.

It will thus be seen that containers of various heights can be passed through the conveyer at the same time, the belt 27 and the pressure rollers 36 accommodating themselves to the various heights to apply the requisite pressure to the containers. The containers are finally delivered on to a table 82.

I claim:

1. In a conveyer of the type described, an upper conveyer member comprising an endless belt supported at one end on a belt driving roller and at the other end on a supporting roller, a plurality of pressure rollers arranged to bear against the inner face of the lower lap of the belt, and a plurality of arms pivotally mounted about axes parallel to the axis of the belt driving roller and each arranged to support a pressure roller, said arms being so arranged that alternate rollers are supported by their respective arms at opposite ends.

2. Apparatus according to claim 1, wherein the arm supporting the first pressure roller is provided with a weighted arm tending to rock the roller supporting arm about its pivot in a direction opposite to the direction of rotation of the belt driving roller.

3. Apparatus according to claim 1, wherein there is provided a lower conveyer platform comprising an endless belt, and means for driving the belt at the same rate as that of the upper belt.

4. A conveyer of the type described, comprising an endless belt supported at one end on a belt driving roller and at the other end on a supporting roller, a plurality of pressure rollers arranged to bear against the inner face of the lower lap of the belt, a plurality of arms pivotally mounted about axes parallel to the axis of the belt driving roller and each arranged to support a pressure roller, said arms being so arranged that alternate rollers are supported by their respective arms at opposite ends, at least one belt tension roller arranged to bear against the upper lap of the belt, and a free-wheel mechanism for the belt driving roller adapted to allow the belt driving roller to over-run under the pull of the belt by the belt tension roller.

5. Apparatus according to claim 4, wherein the arm supporting the first pressure roller is provided with a weighted arm tending to rock the roller supporting arm about its pivot in a direction opposite to the direction of rotation of the belt driving roller.

6. Apparatus according to claim 4, wherein there is provided a lower conveyer platform comprising an endless belt, and means for driving the belt at the same rate as that of the upper belt.

7. A conveyer of the type described, comprising an endless belt supported at one end on a belt driving roller and at the other end on a supporting roller, a plurality of pressure rollers arranged to bear against the inner face of the lower lap of the belt, a plurality of arms pivotally mounted about axes parallel to the axis of the belt driving roller and each arranged to support a pressure roller, said arms being so arranged that alternate rollers are supported by their respective arms at opposite ends, at least one belt tension roller arranged to bear against the upper lap of the belt, a ratchet wheel secured to the belt driving roller shaft and a ratchet pawl pivotally mounted on the belt driving roller and adapted to engage the teeth of the ratchet wheel.

8. In a conveyer of the type described, an upper conveyer member comprising an endless belt supported at one end on a belt driving roller and at the other end on a suporting roller, a plurality of pressure rollers arranged to bear against the inner face of the lower lap of the belt, a plurality of arms pivotally mounted about axes parallel to the axis of the belt driving roller and each arranged to support a pressure roller, said arms being so arranged that alternate rollers are supported by their respective arms at opposite ends, and spring means for urging the pressure rollers into contact with the belt.

9. A conveyer of the type described, comprising an endless belt supported at one end on a belt driving roller and at the other end on a supporting roller, a plurality of spring-loaded pressure rollers arranged to bear against the inner face of the lower lap of the belt, a plurality of arms pivotally mounted about axes parallel to the axis of the belt driving roller and each arranged to support a pressure roller, said arms being so arranged that alternate rollers are supported by their respective arms at opposite ends, at least one belt tension roller arranged to bear against the upper lap of the belt, and a free-wheel mechanism for the belt driving roller adapted to allow the belt driving roller to over-run under the pull of the belt by the belt tension roller.

ALFRED GERMAN ROSE.